Aug. 4, 1964

R. E. McKEE 3,143,121

SLEEPER

Filed June 11, 1962

INVENTOR.
ROBERT E. McKEE
BY Horace B. VanVoorhis
Gary D. Fields
ATTORNEYS

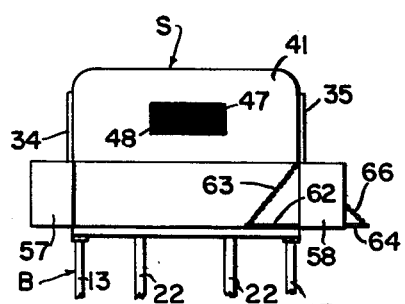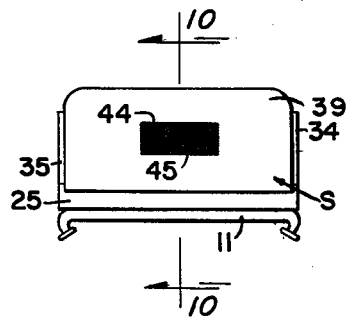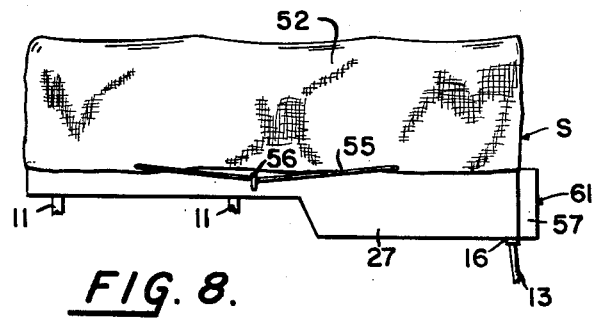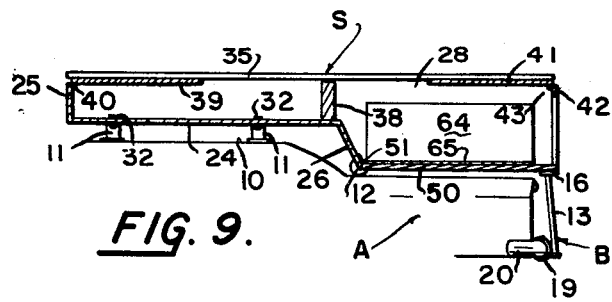

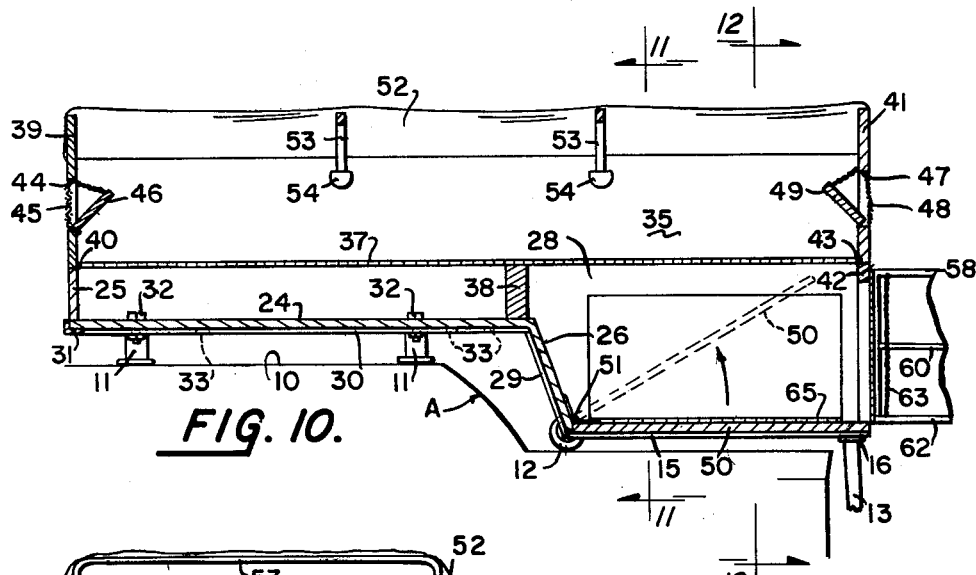
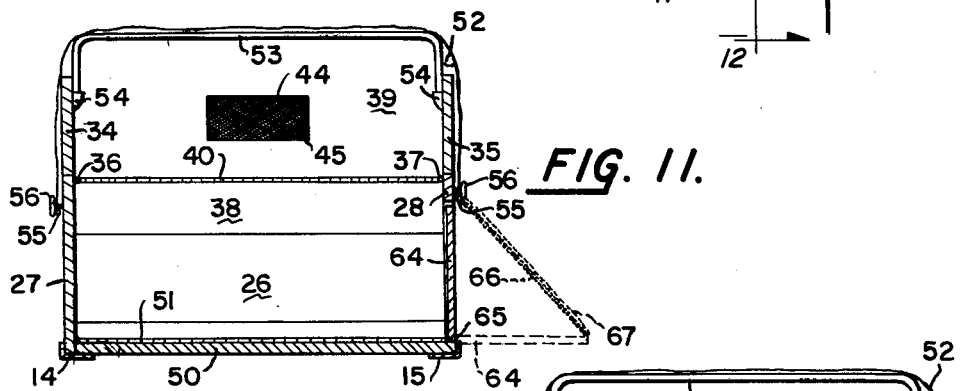
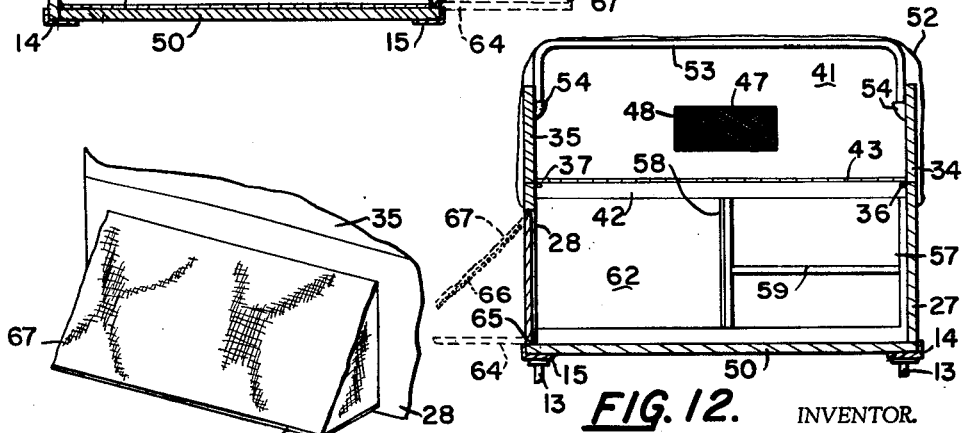

United States Patent Office 3,143,121
Patented Aug. 4, 1964

3,143,121
SLEEPER
Robert E. McKee, 227 Peyton Bldg., Spokane 8, Wash.
Filed June 11, 1962, Ser. No. 201,716
2 Claims. (Cl. 135—1)

This invention relates to a sleeper, and more particularly to a sleeper adapted to be mounted on an automobile for use in camping and/or traveling.

In recent years there has been a decided trend toward vacation travel and camping. The average vacationer now prefers to travel from one spot to another over the two or three week period of his vacation rather than traveling to one location and remaining there for the entire period. This has increased the need for sleeping accommodations and has resulted in a flourishing and ever-expanding motel and motor hotel business. However, these accommodations are quite expensive, particularly for a family. The result has been an ever increasing demand for camping trailers, tents, and other low-cost accommodations which will adequately meet the needs of a family of moderate means. However, the use of both trailers and tents has certain disadvantages which have not been overcome prior to the present invention. If one must purchase a trailer, the expense thereof normally exceeds the cost of staying in a motel and hence the purpose in obtaining the trailer is not accomplished. Furthermore, the trailer is cumbersome and inconvenient to pull and requires additional license plates and in some states vehicles pulling trailers are restricted to a lower speed limit than are other vehicles. Thus, the travel time of the vacationer is greatly increased and the enjoyment of the vacation is reduced. In addition, one is able to obtain only moderate gas mileage, at the best, when pulling a trailer and if one is vacationing in a mountainous or very hilly part of the country it may be extremely difficult, if not impossible, to pull the trailer with an automobile, particularly with the increasingly popular compact automobiles. While a tent is more easily transported on a vacation than is a trailer, a tent has other severe disadvantages. Normally, the tent must be mounted on top of the automobile. This is a difficult job since a tent is quite heavy and in a family consisting of only a husband, wife and small children it may be difficult if not impossible for the husband to lift the tent onto the top of the automobile by himself. Furthermore, it is quite time consuming to erect and dismantle the tent and if the vacationers are moving from spot to spot each day this becomes a very laborious and unpleasant task, resulting in decreased enjoyment of the vacation.

Certain attempts have ben made to overcome these problems, but none have been entirely satisfactory. One such attempt has been the provision of a trailer-like structure which may be mounted on the back of a truck, such as a pickup truck. However, these units are quite expensive and require the vacationer to either own or rent a truck, hardly meeting the needs of the moderate income family. In addition, the vacationers must ride in the truck which affords considerably less comfort than the family automobile.

Among the objects of this invention are to provide an automobile camper or sleeper; to provide a sleeper which may be permanently mounted on an automobile during a trip; to provide a sleeper which may be mounted on automobiles of most makes and sizes; to provide a sleeper which will fold flat for travel, offering little or no wind resistance, but which may be quickly and easily erected for sleeping; to provide a sleeper which will sleep at least four adults; to provide a sleeper which has a foot extension to accommodate adults; to provide a sleeper which contains ample storage space; to provide a sleeper which is provided with a table; and to provide a sleeper which is of relatively simple and economical construction, but is highly efficient in operation.

Additional objects and novel features of this invention will become apparent from the description which follows, taken in conjunction with the accompanying drawings, in which:

FIG. 6 is a rear elevation of the sleeper in raised position with the cupboards open;

FIG. 7 is a front elevation of the sleeper in raised position;

FIG. 8 is a side elevation similar to FIG. 4, but with the canvas attached;

FIG. 9 is a longitudinal section, along line 9—9 of FIG. 3, showing the sleeper in closed position;

FIG. 10 is an enlarged, longitudinal section of the sleeper in raised position, taken along line 10—10 of FIG. 7;

FIG. 11 is a vertical section through the sleeper, looking forward along line 11—11 of FIG. 10;

FIG. 12 is a vertical section through the sleeper, looking rearwardly along line 12—12 of FIG. 10; and FIG. 13 is a fragmentary, side, perspective view showing a foot extension for the lower section of the sleeper.

Figure 1:
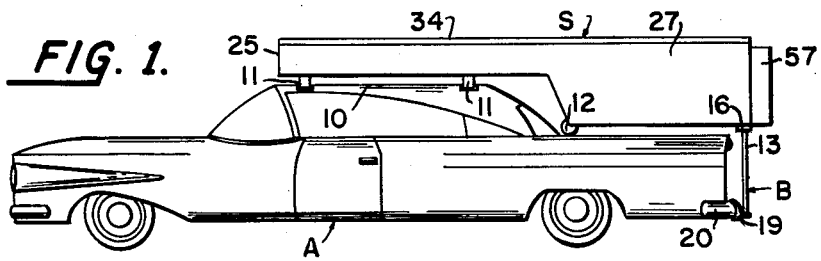
FIG. 1 is a side elevation of the sleeper of this invention in closed or travel position and mounted on an automobile.
Figure 2:
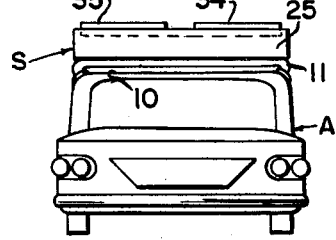
FIG. 2 is a front elevation of the sleeper of FIG. 1.
Figure 3:
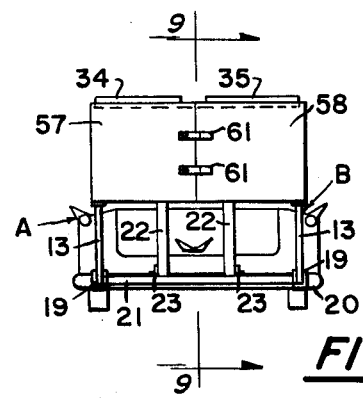
FIG. 3 is a rear elevation of the sleeper of FIG. 1.

In accordance with this invention, a sleeper S is mounted over the roof and trunk of an automobile A, as in FIG. 1, being attached to the roof 10 by means of a pair of spaced roof brackets 11 and is supported at the rear end by a bumper bracket B and just forwardly of the trunk lid by a rest 12. Conveniently, the sleeper S is in the closed or travel position as shown in FIGS. 1–3 and 9, except when in use, and may be made out of plywood or a light metal, such as aluminum.

Figure 4:
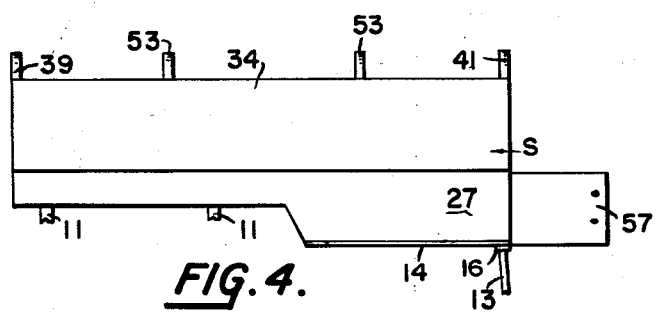
FIG. 4 is a side elevation of the sleeper in raised position, but with the canvas removed.
Figure 5:
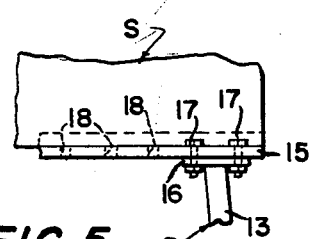
FIG. 5 is an enlarged, fragmentary side elevation of a rear corner of the sleeper showing the bumper bracket attaachment therefor.

Bumper bracket B includes a pair of spaced upright posts 13 whose upper ends are attached to reinforcing angles 14 and 15, which run along the bottom edge of sleeper S, as in FIGS. 4 and 5. Conveniently, post 13 is provided at the upper end with a bearing plate 16 on which angle 15 rests, as in FIG. 5, and is held in place by a pair of bolts 17. A plurality of holes 18 are provided along angle 15 so that the bumper bracket B may be adjusted for use on cars of various lengths. The lower ends of posts 13 are attached to bumper plates 19 which are attached to bumper 20 and may include means (not shown) for adjusting the height or effective length of posts 13. Bumper plates 19 are separated by a spacer bar 21, extending along bumper 20, having a pair of spaced supports 22 extending upwardly for supporting the bottom of sleeper and adapted to be pivoted to generally horizontal positions about hinges 23 for a purpose to be discussed.

As seen in FIGS. 9–12, the sleeper includes a floor 24, which extends above the automobile roof 10, a front wall 25, a downturned diagonal section 26 which extends down past the rear window of the automobile, and side walls 27 and 28. Besides angles 14 and 15 which extend along the rear portion of side walls 25 and 26, reinforcing angles are provided along diagonal portion 26 and floor 24, such as angles 29 and 30 respectively. In addition, an angle 31 extends across the front edge of floor 24. Conveniently, all of these angles may be welded together to form a rigid frame for the sleeper. Advantageously, the sleeper is attached to roof brackets 11 by bolts 32 extending through the side angles, such as angles 30. The angles may include a plurality of holes 33 therein so that brackets 11 may be attached at various positions along the angle to accommodate various length automobiles. The sleeper is also provided with a pair of side panels 34 and 35 which are hinged to the upper ends of side walls 27 and 28, respectively, by piano hinges 36 and 37 of FIGS. 11 and 12 and are adapted to fold down across the top of the sleeper when in closed position, as in FIGS. 2, 3 and 9, but may be raised, as shown in FIGS. 4 and 11, when the sleeper is in use. As in FIG. 9, the side panels are supported, when in down position, by spacer 38 extending across the end of floor 24. Also, a front panel 39 is hinged to front wall 25 by a piano hinge 40, while a rear panel 41 is hinged to a spacer bar 42, extending across the rear of the sleeper, by piano hinge 43, as best seen in FIG. 10. Conveniently, front panel 39 is provided with a window opening 44 covered with a screen 45 and provided with a flap 46 which may be closed to prevent cold air from entering the sleeper or held in open position by suitable means, such as a chain. Also, rear panel 41 is provided with a window opening 47 covered with a screen 48 and having a flap 49 which may be closed to prevent the entrance of cold air and may also be held in open position by a chain.

A floor panel 50 is attached to the lower end of diagonal panel 26 by means of a piano hinge 51 and may be pivoted to the raised position shown in dotted lines in FIG. 10 for access to the car trunk. When floor panel 50 is down, it is supported by angles 14 and 15 and by spaced supports 22. However, when floor panel 50 is raised, supports 22 may be pivoted about hinges 23 to a generally horizontal position to make the trunk of the automobile more accessible.

A canvas top 52, which is conveniently waterproof, extends over a plurality of arcuate rods 53, as best seen in FIGS. 4, 10, 11 and 12. Conveniently, these rods may fit into sockets 54 on side panels 34 and 35. The canvas is held in place by tie strings 55, as in FIG. 8, which may be hooked over hooks 56 attached to side walls 27 and 28. When the sleeper is in the down or travel position, rods 53 may be stored within the sleeper on floor 24.

Conveniently, the rear of sleeper S is closed by cupboards 57 and 58 which have shelves 59 and 60, respectively, as in FIGS. 10 and 12, to provide plenty of storage space for camping gear and other articles, the cupboards being hinged to side walls 27 and 28, respectively. Advantageously, the cupboards may be held in closed position by suitable catches 61, as in FIG. 3. Cupboard 58 is provided with a dropleaf table 62 which is adapted to swing down, as in FIGS. 6 and 10, and is held in position by a pair of chains 63. This table provides adequate room for placing a cookstove and/or eating.

A foot extension 64 is provided in side wall 28 and attached thereto by a hinge 65 which may be dropped down to serve as an additional table and is held in place by chain 65, as in FIG. 6. Thus, additional eating and/or work space is also provided. Also, this foot extension provides additional room at the rear of the sleeper for accommodation of two adult campers, when the camper is being used for sleeping purposes. It will be readily apparent that two adults may sleep in the upper portion of the sleeper on air mattresses which may be placed on floor 24. Also, with the foot extension the lower portion of the sleeper may accommodate two more adults who sleep transversely across the floor panel 50 with their feet extending into foot extension 64. When the camper is used for sleeping purposes, foot extension 64 may be covered by a waterproof canvas covering 67, as seen in FIG. 13, which will prevent cold air and rain from entering the sleeper at night. If the vacationers or campers include several children, these children may sleep in the rear portion of the camper on floor panel 50 and it will probably not be necessary to lower foot extension 64, while the adults may sleep in the upper portion of the camper on floor 24. Of course, during travel the entire sleeper may be used for storage of camping equipment such as cook stoves, tables, sleeping bags, etc.

From the foregoing, it will be readily apparent that a sleeper constructed in accordance with this invention fulfills to a marked degree the objects and novel features hereinbefore set forth. A sleeper has been provided which is mounted on the top of a car and folds flat for travel, offering very little, if any, wind resistance since the portion above the roof is of minimal height. Furthermore, the sleeper is provided with adjustment means so that it can be mounted on an automobile of almost any make or size. Also, a sleeper has been provided which can easily sleep four adults, two adults sleeping in the forward portion and two adults sleeping in the rear portion. Also, the sleeper is provided with a pair of cupboards which provides adequate storage space for various articles, one cupboard having a dropleaf table which may be used for cooking and/or eating purposes. The camper is arranged so that the trunk lid may be opened by pivoting floor panel 50 about a hinge at the forward end thereof. Finally, the sleeper is of relatively simple construction, yet is durable and may be raised and lowered in a minimum amount of time and requires no great physical exertion on the part of the person erecting the camper.

Although a preferred embodiment of this invention has been illustrated and described, it will be understood that various changes and variations may be made without departing from the spirit and scope of this invention.

What is claimed is:

1. A camper or sleeper adapted to be mounted on an automobile having a passenger compartment, a trunk and a rear bumper, including a generally rectangular box-shaped body, having front and side walls, said body having a front portion of lesser depth and a rear portion of greater depth, thereby being adapted to be mounted with the front portion disposed over the top of the passenger compartment of said automobile, and the rear portion disposed over the trunk of said automobile; means for attaching the front portion of said body to said top of said automobile; supporting means attached to the rear of said body and adapted to be attached to the rear bumper of said automobile in upstanding relation thereto; side panels hinged to the top of said side walls; a front panel hinged to the top of said front wall; a bar extending between the rear upper edges of said side walls; a rear panel hinged to said bar, each of said panels being adapted to be moved between a horizontal, closed position and a vertical, open position; a covering adapted to be extended over said panels when in open position to form a top; and a pair of doors pivotally connected to the rear edge of said side walls below said bar and adapted to be swung between open and closed positions.

2. A camper or sleeper adapted to be mounted on an automobile having a passenger compartment, a trunk having a lid, a panel between said lid and said passenger compartment and a rear bumper, including a generally rectangular box-shaped body, having front and side walls, said body having a front portion of lesser depth and a rear portion of greater depth, thereby being adapted to be mounted with the front portion disposed over the top of the passenger compartment of said automobile and the rear portion disposed over the trunk of said automobile; means for attaching the front portion to said top of said automobile; a rest mounted on the underside of the rear portion of said body and adapted to rest on said panel between the trunk lid and the passenger compartment; a floor panel extending along the bottom of said deeper portion and pivoted at the forward end thereof, so that the floor panel may be raised for raising said lid of said automobile trunk; spaced brackets adapted to extend upwardly from said bumper to the underside of the rear end of said deeper portion; a spacer extending between said bumper brackets; a plurality of spaced supports extending upwardly from said spacer; and hinges pivotally attaching said supports to said spacer, so that said supports may be swung to a generally horizontal position to facilitate access to said trunk.

References Cited in the file of this patent

UNITED STATES PATENTS

| | | |
|---|---|---|
| 2,614,882 | Cook | Oct. 12, 1952 |
| 2,713,689 | Godwin | July 26, 1955 |
| 2,718,015 | Fisk | Sept. 20, 1955 |
| 2,782,068 | Esche | Feb. 19, 1957 |
| 2,867,471 | Coon | Jan. 6, 1959 |
| 2,976,078 | Maidl | Mar. 21, 1961 |